United States Patent Office.

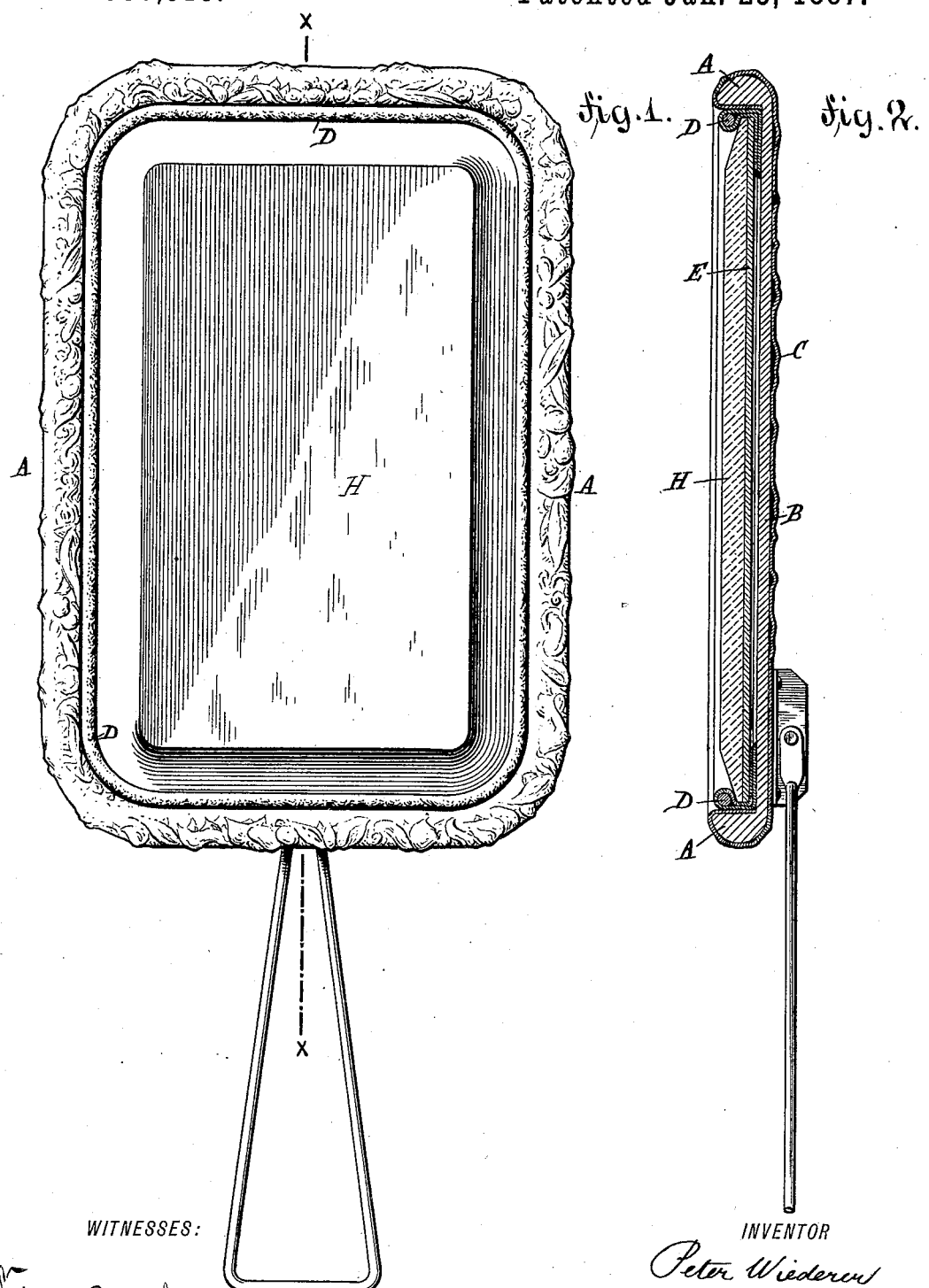

PETER WIEDERER, OF NEW YORK, N. Y.

MIRROR.

SPECIFICATION forming part of Letters Patent No. 356,515, dated January 25, 1887.

Application filed March 1, 1886. Serial No. 193,611. (No model.)

*To all whom it may concern:*

Be it known that I, PETER WIEDERER, of the city, county, and State of New York, have invented certain new and useful Improvements in Mirror-Frames, of which the following is a specification.

Heretofore the frames of small mirrors—such as hand-mirrors and the like—have been covered with plush or leather, which materials are rather expensive, and in many cases can only be adjusted to fit properly on the frame with great labor and difficulty.

The object of my invention is to provide a cover for the frames of mirrors which is not only less expensive than the frames used heretofore, but has the advantage that it can be adapted to different shapes of frames, fits well and tightly on the same, and produces a very handsome effect.

The invention consists in a mirror-frame and back provided with a covering of embossed fancy-colored paper, which is secured on the frame and back and drawn over the sides of the frame; and the invention also consists in covering a piece of cord or wire with said paper and gluing the edges of the paper surrounding the cord to the back of the mirror, for the purpose of holding said cord on the edges of the mirror, all as will be fully described and set forth hereinafter, and pointed out in the claim.

In the accompanying drawings, Figure 1 is a front view of a mirror provided with my improved frame. Fig. 2 is a cross-sectional view of the same on line $x\ x$, Fig. 1.

Similar letters of reference indicate corresponding parts.

The mirror-frame A and back B are made of a single piece in the usual manner, and the rear surface of said back and the outer sides of the frame are provided with a covering, C, of embossed and colored or gilt paper—that is, paper on which fanciful designs are produced by embossing or gilding, which paper is usually known as "Japanese paper." The paper is glued to the back and sides of the frame, and, as it is thin, pliable, and tough, it can be drawn tightly over the sides of the frame and glued in place, and finished much better than leather or plush. A cord or wire, D, is surrounded by like paper, and the edges of the paper are glued together and to the back of the mirror or to the pasteboard or wooden sheet E, glued to the back of the mirror. The covered cord D rests on the face of the mirror H at the edges, and is held in this position by the paper strips glued to the back of the mirror. The mirror with its cord is pressed into the recess or cavity in the mirror-holder, and is held in place by the friction between paper covering of the cord and the sides of the cavity in the frame and back.

Having thus described my invention, I claim as new and desire to secure by Letters Patent—

The combination, with a mirror-frame having a recess or cavity for receiving the mirror, of a cord or wire surrounding the mirror on the outer surface at the edges of the mirror, and of a paper cover surrounding the said cord or wire, and having its edges glued to the back of the mirror, whereby the covered cord is held in place on the edges of the mirror, substantially as shown and described.

In testimony that I claim the foregoing as my invention I have signed my name in presence of two subscribing witnesses.

PETER WIEDERER.

Witnesses:
 CARL KARP,
 SIDNEY MANN.